C. H. F. BERGNER.
AUTOMOBILE STARTER.
APPLICATION FILED DEC. 4, 1914.

1,205,592.

Patented Nov. 21, 1916.

WITNESSES
George DuBoy
M. H. Lockwood

INVENTOR
CARL H. F. BERGNER
BY
Briesen & Knauth
ATTORNEYS

UNITED STATES PATENT OFFICE.

CARL H. F. BERGNER, OF HARRINGTON PARK, NEW JERSEY.

AUTOMOBILE-STARTER.

1,205,592.   Specification of Letters Patent.   Patented Nov. 21, 1916.

Application filed December 4, 1914. Serial No. 875,395.

*To all whom it may concern:*

Be it known that I, CARL H. F. BERGNER, a citizen of the German Empire, and resident of Harrington Park, Bergen county, New Jersey, have invented certain new and useful Improvements in Automobile-Starters, of which the following is a specification.

My invention relates to means adapted to permit the driver of an automobile to start the engine from the seat of the machine by direct manual effort.

I am aware that power starters of various kinds are employed which can be set in operation from the seat but these are expensive both in first cost and in upkeep.

The object of my invention is to provide a simple device which may be readily applied to existing types of automobiles at small expense and by means of which the driver while in the machine by simply operating a lever, preferably by hand, can turn the crank shaft over and thereby start the engine.

I have found that, by using certain well-known ignition systems, a quarter turn of the crank shaft ordinarily will be sufficient to start the engine and my starting mechanism is adapted by a quick rocking movement of the hand lever adjacent the seat, to turn the crank shaft about one quarter turn thereby compressing sufficient gas in one of the cylinders for the electric spark to ignite the same and start the engine.

In the accompanying drawings I have shown one form of my starting mechanism of which—

Figure 1:
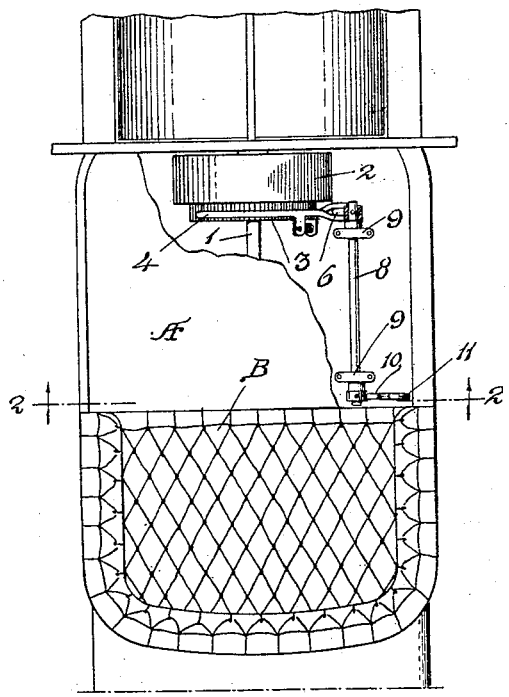
Figure 2:
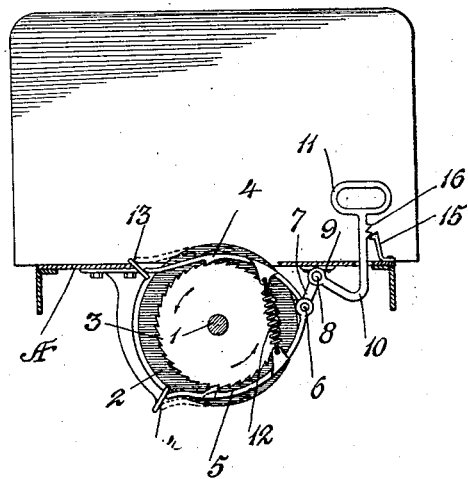

Figure 1 is a plan view and Fig. 2 an end elevation looking toward the engine.

Referring to the drawings it will be noticed that I have merely shown my improved mechanism and have not attempted to show the entire automobile for those skilled in the art will readily understand the application and adaptation of the device to automobiles of various kinds. The engine may be of any well known type having as usual, a crank shaft 1 and a fly wheel 2 the latter of which in the present instance I provide with a ratchet wheel 3 cut thereon or attached thereto in any suitable manner.

Preferably I provide a pair of pawls 4 and 5, adapted to take into the teeth of the ratchet wheel 3 the pawls being disposed on opposite sides of the wheel so that one thrusts and the other pulls so as to turn the wheel and crank shaft in one direction as indicated in the drawings. The pawls 4, 5 are preferably pivoted at the same point 6 on the end of a rock lever 7 fixed to a rock shaft 8 which is adapted to lie along the under side of the automobile bed A. The rock shaft 8 may be supported in any suitable manner as by bearing blocks 9 secured to the under framing of the automobile body as shown.

The rock shaft 8 preferably is extended to a point below the front seat B of the machine and is there provided with a hand lever 10 having a handle 11 located conveniently to the driver, so that by operating same up and down the pawls 4 and 5 will drive the ratchet wheel 3 and turn the crank shaft 1 of the engine.

The pawls 4 and 5 are preferably held in operative engagement with the ratchet wheel 3 by a spring 12. When the engine is running or when the starter is not in use it is desirable that the pawls 4 and 5 be held out of contact with the ratchet wheel 3 and for this purpose any suitable stops may be employed as for instance the cam lugs 13 and 14 which coöperate with the extreme ends of the pawls 4 and 5 respectively when the same are thrust to the left as indicated in Fig. 2.

To maintain the pawls in the disengaged position a suitable pawl or locking lug may be applied to the handle lever as for instance the spring pawl 15 which is adapted to coöperate with a notch 16 on the handle lever below the handle 11 as shown in Fig. 2 of the drawings, the spring pawl 15 being secured to the bed of the automobile.

The operation of the device will readily be understood from the above description and I have found that with a suitable electric ignition system, operating the lever 10, 11 back and forth once or twice will be sufficient to start the engine.

It will be understood that I do not wish to be confined to the specific details of the form shown, for various modifications will occur to those skilled in the art in adapting my idea to various types of machines within the spirit and scope of the claim.

It will be understood that the lever 10 can be arranged to be operated by the foot and in the claim the words manual effort is intended to include operation by the foot when the mechanism is so arranged.

I claim:

An automobile starter comprising a ratchet wheel connected with the crank shaft of the engine, a pair of arms lying on opposite sides of said wheel with respect to its center, pawls on each of said arms co-operating with said wheel, an operating lever pivoted to the frame of the machine and having a free end pivotally joined to an end of each of said arms, said pivotal joining point thus having a to and fro motion with respect to the ratchet wheel when the aforesaid lever is operated, and cam lugs arranged to engage the free ends of the pawl carrying arms so as to move the pawls out of engagement with the ratchet wheel when said pivotal joining point is in its innermost position.

In testimony whereof, I have hereunto set my hand in the presence of two subscribing witnesses.

CARL H. F. BERGNER.

Witnesses:
M. H. LOCKWOOD,
FRITZ ZIEGLER, Jr.

Copies of this patent may be obtained for five cents each, by addressing the "Commissioner of Patents, Washington, D. C."